United States Patent [19]

Blagev et al.

[11] Patent Number: 5,641,470
[45] Date of Patent: Jun. 24, 1997

[54] PROCESS FOR MAKING GOETHITE

[75] Inventors: Albena Blagev, Woodbury; Gerald G. Endres, Hastings, both of Minn.

[73] Assignee: Minnesota Mining and Manufacturing Company, St. Paul, Minn.

[21] Appl. No.: 502,905

[22] Filed: Jul. 17, 1995

[51] Int. Cl.$^6$ ............................................. C01G 49/02
[52] U.S. Cl. ..................... 423/632; 423/633; 252/62.56
[58] Field of Search .............................. 423/632, 633, 423/140, 142; 252/62.56

[56] References Cited

U.S. PATENT DOCUMENTS

| | | | |
|---|---|---|---|
| 3,974,267 | 8/1976 | Urban, Jr. | 423/633 |
| 4,061,726 | 12/1977 | Ohlinger et al. | 423/633 |
| 4,061,727 | 12/1977 | Vaeth et al. | 423/633 |
| 4,112,063 | 9/1978 | Buxbaum et al. | 423/633 |
| 4,255,492 | 3/1981 | Audran et al. | 428/694 |
| 4,576,635 | 3/1986 | Araki et al. | 75/348 |
| 4,755,315 | 7/1988 | Steck et al. | 252/62.56 |
| 5,139,767 | 8/1992 | Matsunaga et al. | 423/633 |
| 5,399,278 | 3/1995 | Yamashita et al. | 423/632 |

FOREIGN PATENT DOCUMENTS

| | | | |
|---|---|---|---|
| 56-22638 | 3/1981 | Japan | 423/632 |
| 58-25202 | 2/1983 | Japan. | |
| 58-192308 | 11/1983 | Japan. | |
| 1-212231 | 8/1989 | Japan. | |
| 1-212232 | 8/1989 | Japan | 423/632 |
| 4-219322 | 8/1992 | Japan | 423/632 |
| 5-32423 | 2/1993 | Japan. | |
| 95/02242 | 1/1995 | WIPO. | |

*Primary Examiner*—Ngoc-Yen Nguyen
*Attorney, Agent, or Firm*—Gary L. Griswold; Walter N. Kirn; Susan Moeller Zerull

[57] ABSTRACT

This invention provides a method of producing goethite particles comprising the steps of a) reacting, in aqueous solution, less than a stoichiometric amount of an alkali compound with an iron (II) salt to form a precipitated complex intermediate, b) oxidizing iron (II) in the complex intermediate to iron (III) at an average rate less than 10 g iron(III)/l/hr to form goethite seed particles until 20 to 70% of iron (II) in the precipitated complex intermediate has been converted to iron (III), and c) after 20 to 70% of iron (II) in the precipitated complex intermediate has been convened to iron (III), increasing the average oxidation rate to greater than 10 g iron(III)/l/hr.

12 Claims, No Drawings

PROCESS FOR MAKING GOETHITE

FIELD OF THE INVENTION

This invention relates to a method of producing acicular goethite (alpha-ferric oxyhydroxide) particles useful in the production of iron oxide or metal particles for use in magnetic recording media.

BACKGROUND OF THE INVENTION

Magnetic recording media, such as audio and video tapes, computer diskettes, etc., typically have a magnetizable layer coated on a substrate. The magnetizable layer frequently comprises magnetic particles in a binder. Particles of acicular $\gamma$-$Fe_2O_3$ (mag-hematite) and $Fe_3O_4$ can be used in the magnetizable layer. These particles can be prepared by dehydrating goethite ($\alpha$-FeOOH) to form hematite ($\alpha$-$Fe_2O_3$), reducing the particle to magnetite ($Fe_3O_4$) and oxidizing at least a portion of the magnetite to $\gamma$-$Fe_2O_3$. The $\gamma$-$Fe_2O_3$ may be further modified with cobalt by known methods as desired. As demand grows for high recording density and high signal to noise ratios, the requirements for the magnetic particles become more stringent.

The magnetic particles should be of submicron size, be acicular with a large aspect ratio (major axis/minor axis), have a narrow particle size distribution, and be substantially free of dendrites (particle branching) or other irregularities. The size, shape, and distribution of the magnetic particles are directly affected by the size, shape, and distribution of the goethite precursor particles. Goethite particles which have a high aspect ratio (are acicular), are uniform in size, and are substantially free of dendrites will be more likely to provide magnetic particles with the desired properties.

Several processes are known for producing acicular goethite particles. These processes fall into two general categories, a high pH (or alkaline) method and a low pH method.

According to the alkaline method, a slurry of ferrous salt is reacted with an excess stoichiometric amount of an alkali hydroxide to form ferrous hydroxide. The ferrous hydroxide is then oxidized while the pH remains at levels greater than about 11. This high pH process produces goethite particles that have high aspect ratios. Controlling the oxidation profile may be used to affect size, shape and distribution of the particles. Unfortunately, these particles also tend to have a relatively large amount of dendrites and a particle size distribution which is too wide. Manufacturing costs also make this approach less desirable than the low pH method. A subset of the alkaline method is a "carbonate" type process as disclosed, for example, in JP 03-223120.

According to the low pH method, the goethite is prepared, at a pH less than 6, by reacting ferrous salt with less than a stoichiometric amount of an alkali compound (usually a hydroxide or a carbonate) to form a precipitated complex intermediate compound. When ferrous sulfates, chlorides, or carbonates are used this complex intermediate is called "green rust". See, e.g., A. Olowe and J. Genin, *The Mechanism of Oxidation of Ferrous Hydroxide in Sulphated Aueous Media: Importance of the Initial Ratio of Reactants*, Corrosion Science, vol. 32, p. 965–984 (1991). The intermediate compound is then oxidized to form goethite seed particles. Since less than a stoichiometric amount of alkali was added, iron(II) ions that did not react to form the complex intermediate compound are still available in the solution. These iron(II) ions are not affected by the oxidation reaction. However, with further addition of alkali compound, this iron(II) precipitates on the seed particles as an intermediate compound. The further addition of alkali compound and further oxidation, therefore, enables one to grow the goethite seeds to the desired size.

The size and shape of the final goethite particles depend upon the size and shape of the goethite seed particles. A popular method of controlling the size and shape of goethite seed particles has been the use of growth regulating agents, such as compounds of phosphate, silicate, zinc, nickel, and chromium, and carboxylicates. These growth regulating agents typically provide a more uniform size distribution, but unfortunately they also decrease the aspect ratio of the particles. The reduced aspect ratio leads to magnetic particles with lower coercive force ($H_c$). Another method calls for the addition of acid compounds during seed formation which lowers the viscosity and narrows the particle size distribution. However, here too, there is a tradeoff between particle size distribution and aspect ratio (the narrower the distribution the lower the aspect ratio). Thus, there remains a need for a process which produces goethite particles with high aspect ratios as well as excellent shape and narrow size distribution.

SUMMARY OF THE INVENTION

The present invention is a novel process for producing goethite particles which have high aspect ratios as well as excellent shape and narrow size distribution. The inventors have found that careful control of the oxidation rate in a low pH preparation method enables the formation of goethite seed particles with high aspect ratios and narrow size distribution.

Specifically, this invention provides a method of producing goethite particles comprising the steps of a) reacting, in aqueous solution, less than a stoichiometric amount of an alkali compound with an iron (II) salt to form a precipitated complex intermediate, b) oxidizing iron (II) in the complex intermediate to iron (III) at an average rate less than 10 g iron(III)/l/hr to form goethite seed particles until 20 to 70% of iron (II) in the precipitated complex intermediate has been converted to iron (III), and c) after 20 to 70 mole % of iron (II) in the precipitated complex intermediate has been converted to iron (III), increasing the average oxidation rate to greater than 10 g iron(III)/l/hr.

The resulting submicron size goethite seed particles may be grown by further addition of an alkali and additional oxidation.

DETAILED DESCRIPTION OF THE INVENTION

The iron (II) salt used in step a) of the present invention may be any inorganic iron (II) salt such as iron (II) nitrate, iron (II) chloride, etc. Iron (II) sulfate is preferred.

The alkali may be sodium hydroxide, potassium hydroxide, sodium carbonate, potassium carbonate, ammonium hydroxide. The amount of alkali added to the iron (II) salt solution is less than the stoichiometric amount and is preferably in the range of 0.15–0.75 (mole ratio of iron (II)/OH$^-$), more preferably 0.2–0.55. When the alkali is added to an aqueous solution of the iron (II) salt in less than a stoichiometric amount, a complex intermediate is formed. When ferrous sulfates, chlorides, or carbonates are used this complex intermediate is called "green rust".

The present invention controls the size, shape, and size and shape distributions, by controlling the oxidation rate during the formation of the goethite seed particles. The oxidation rate is initially slow. The average oxidation rate during this initial period should preferably be kept below 10 g $Fe^{+3}$/l/hr, more preferably between 2 and 9 g $Fe^{+3}$/l/hr, more preferably still between 3 and 8 g $Fe^{+3}$/l/hr, and most preferably between 4 and 7.5 g $Fe^{+3}$/l/hr. The oxidation efficiency, as defined by (oxygen stoichiometrically required)/(oxygen available)×100, during this initial oxidation step is preferably in the range of 30–90%, more preferably 50–80%. This slow oxidation rate is maintained until about 20 to about 70%, preferably 30 to 65% of the iron (II) in the complex intermediate has been converted to iron (III), thereby forming goethite. After such a suitable amount of the iron (II) has been oxidized to iron (III), the oxidation rate is increased. Alternatively, when the oxidation efficiency decreases below about 5–20%, the oxidation rate is increased.

The formation of the goethite seeds particles continues at a high oxidation rate, preferably greater than 10 g $Fe^{+3}$/l/hr, more preferably greater than 12 g $Fe^{+3}$/l/hr, more preferably still between about 12 and 40 g $Fe^{+3}$/l/hr, and most preferably between 15 and 35 g $Fe^{+3}$/l/hr. This higher oxidation rate may comprise a single step only or two or more steps of increasing rates. The oxidation efficiency during the high oxidation rate portion of the goethite seed formation is preferably more than about 5%, more preferably greater than 10%.

A variety of oxidizing agents may be used such as oxygen, air, potassium permanganate, hydrogen peroxide, etc. However, the preferred oxidizing agent is air. The temperature of the oxidation reaction is in the range of 10° to 75° C., preferably 25° to 60° C. When the temperature becomes too high, magnetite crystals are formed. When the temperature becomes too low the reaction time becomes very long and particle size distribution deteriorates.

The rate of oxidation is controlled by adjusting the amount of oxidizing agent, e.g. the flow rate of oxidizing gas, and/or the temperature of the reaction. To maintain a low initial average oxidation rate when air is used as the oxidizing gas, the initial flow rate of air is preferably maintained at about 50–200 cc/min/l and the temperature is preferably in the range of about 40°–60° C. After this initial oxidation step, the oxidation rate is increased by either increasing the temperature, increasing the amount of oxidizing agent in the system, or a combination of both. Preferably, the oxidation rate is increased by increasing the flow rate of the air to about 300 to 600, more preferably 400–550 cc/min/l. However, the amount of oxidizing gas and the temperature which is desirable is dependent on such items as reactor configuration, amount, rate of agitation, etc.

If desired, a growth regulating agent may be used, such as phosphorous compounds, silicates, carboxylic acids and their metal salts. See e.g., JP3-131525 incorporated herein by reference.

The goethite seed particles produced by the low pH, two step oxidation process of this invention may be grown to the desired size by further addition of alkali and subsequent oxidation.

The goethite particles can be converted to useful magnetic iron oxides by any known method. These magnetic iron oxides will have higher coercivities than comparable magnetic iron oxides manufactured from goethite with less desirable size and shape. Magnetic recording tapes produced using these magnetic oxides will have lower switching field distribution (SFD) and lower noise than tapes produced from magnetic iron oxides manufactured from goethite with less desirable size and shape.

Alternatively, these goethite particles may be used as precursors for metal powder as shown, for example, in U.S. Pat. No. 4,576,635, incorporated herein by reference.

The invention is further illustrated by the following examples.

EXAMPLE 1

258 grams of $FeSO_4 7H_2O$ were dissolved in 700 ml of deionized water where 1.5 grams of concentrated $H_2SO_4$ have been dissolved in advance. In a separate vessel 15 grams of NaOH were dissolved in 100 ml of deionized water. The iron (II) salt solution was placed in a covered 3 liter reaction vessel equipped with stirring device, gas introduction tube, and temperature controller. 62 ml of a water solution containing methaphosphoric acid was added.

The iron salt solution was heated to 40° C. The NaOH solution was added under a nitrogen gas blanket as the reaction vessel was stirred. After mixing for two minutes, the suspension was transferred to a glass column reactor where an air flow was introduced through the bottom glass porous plate. The temperature remained at about 40° C. and the air flow was 100 cc/min for 2 hours, the air flow was then increased to 500 cc/min and the temperature increased to 45° C. for 0.5 hours. Initial average oxidation rate was 5.4 g $Fe^{+3}$/l/hr over 2 hours. The average oxidation rate for the second portion of the oxidation was 10.6 g $Fe^{+3}$/l/hr. During each oxidation phase, over which the air flow rate was maintained at a constant level, the oxidation rate was initially higher and slowed over time. The overall average oxidation rate was 4.2 g $Fe^{+3}$/l/hr. This is an example of the inventive process of using a slow oxidation rate followed by a fast oxidation rate with a low pH process for producing goethite.

COMPARATIVE EXAMPLES 1–3

The procedure of Example 1 was repeated but the air flow rate was adjusted as indicated.

For Comparative Example 1 the air flow rate was held at 100 cc/min for the entire seeding oxidation process. The initial average oxidation rate of 5.7 g $Fe^{+3}$/l/hr over 1 hour was followed by a slower rate of 1.05 g $Fe^{+3}$/l/hr for 4 hours. Overall average rate was 2.5 g $Fe^{+3}$/l/hr. This is an example of using only slow average oxidation rates.

For Comparative Example 2 the air flow rate was maintained at 500 cc/min for the entire seeding oxidation process. The initial average oxidation rate of 21.8 g $Fe^{+3}$/l/hr for 0.5 hours was followed by a slower rate of 9.6 g $Fe^{+3}$/l/hr for 0.5 hours. Overall average rate was 12.6 g $Fe^{+3}$/l/hr. This is an example of using only fast average oxidation rates.

For Comparative Example 3 the air flow rate was maintained at 500 cc/min for fifteen minutes but was then reduced to 100 cc/min for 3 hours and 45 minutes. The initial average oxidation rate of 21.6 g $Fe^{+3}$/l/hr over 15 minutes was followed by an intermediate average oxidation rate of 9.6 g $Fe^{+3}$/l/hr over 0.5 hours which in turn was followed by a slower average rate of 0.75 g $Fe^{+3}$/l/hr for 3 hours and 15 minutes. This is an example of using an initially fast average oxidation rate followed by a slow average oxidation rate.

The goethite particles of Example 1 and Comparative Examples 1–3 were tested for specific surface area (SSA), average length ($L_{av}$) and standard deviation of lengths ($\sigma_L$), and average thickness ($D_{av}$) and standard deviation of thicknesses ($\sigma_D$). The results in the following Table demonstrate that the particles made with the process of this invention provides goethite seed particles with good specific surface area (SSA), aspect ratio (L/D), and size. The goethite particles prepared according to this invention also have a much better size distribution than do particles made by the other approaches.

| Example | SSA (m²/g) | L/D | $L_{av}$ (μm) | $\sigma_L$ | $D_{av}$ (μm) | $\sigma_D$ |
|---|---|---|---|---|---|---|
| 1 | 106 | 10.8 | 0.192 | 0.068 | 0.0178 | 0.21 |
| Comp. 1 | 100 | 11.4 | 0.190 | 0.138 | 0.0169 | 0.24 |
| Comp. 2 | 139 | 11.4 | 0.119 | 0.126 | 0.0105 | 0.25 |
| Comp. 3 | 91 | 10.7 | 0.179 | 0.230 | 0.0167 | 0.36 |

EXAMPLES 2 AND 3 AND COMPARATIVE EXAMPLE 4

A process similar to that performed in the previous example was performed at a pilot plant scale using a reactor having a 1000 l working capacity. Sufficient NaOH was used to precipitate 0.49 mole % of the iron sulfate. The initial temperature of the iron sulfate solution was 17° C. The initial temperature of the NaOH solution was 27° C. The NaOH solution was added under a nitrogen gas blanket as the reaction vessel was stirred. After precipitation of the intermediate complex the sample was oxidized as indicated in the following table. Time indicates the time for which the condition was maintained. Times are set forth in order of occurrence.

| Example Time (minutes) | Seed Agitation Rate (rpm) | | | | Seed Oxidation Rate (ft³/hr) | | | | Seed Temperature (°C.) | | | |
|---|---|---|---|---|---|---|---|---|---|---|---|---|
| | 30 | 20 | x | y | 30 | 20 | x | y | 30 | 20 | x | y |
| 2 | 250 | 300 | 390 | — | 150 | 300 | 2000 | — | 25 | 25 | 27 | — |
| 3 | 250 | 300 | 390 | 320 | 150 | 300 | 1300 | 400 | 25 | 25 | 27 | 57 |
| Comp. 4 | 390 | 390 | 390 | 390 | 2600 | 2600 | 2600 | 2600 | 27 | 27 | 27 | 27 |

For Example 2, x = 50 and y = 0.
For Example 3, x = 30 and y = 40.
For Comparative Example 4, x + y = 11.

Example 2 had an initial average oxidation rate of 7.0 g $Fe^{+3}$/l/hr followed by an increase in average oxidation rate to 23.3 g $Fe^{+3}$/l/hr followed by a second increase in average oxidation rate to 28.7 g $Fe^{+3}$/l/hr. The overall average oxidation rate was 14.4 g $Fe^{+3}$/l/hr.

Example 3 had an initial average oxidation rate of 7.0 g $Fe^{+3}$/l/hr followed by an increase in average oxidation rate to 23.3 g $Fe^{+3}$/l/hr followed by a second increase in average oxidation rate to 35 g $Fe^{+3}$/l/hr. The overall average oxidation rate was 11.7 g $Fe^{+3}$/l/hr.

Comparative Example 4 had an initial average oxidation rate of 44.0 g $Fe^{+3}$/l/hr followed by a decrease in oxidation rate to 15.6 g $Fe^{+3}$/l/hr. The overall average oxidation rate was 23.9 g $Fe^{+3}$/l/hr.

The particles produced by the conditions indicated in the table were grown by slowly adding additional NaOH while continuing to supply air so that the pH was controlled initially at 3.2 and gradually increased to 4.0. When the iron (II) was completely precipitated and oxidized, more $FeSO_4$ solution was added and gradually oxidized.

The grown particles have specific surface areas of 82, 76, and 74 m²/g for Examples 2, 3, and Comparative Example 4, respectively.

EXAMPLE 4

The particles from Example 3 were surface treated with an antisintering agent and converted to gamma $Fe_2O_3$ by dehydrating and heat treating at a temperature of 635° C., reducing at 477° C. using an organic reducing agent, and oxidizing at 315° C. The gamma $Fe_2O_3$ was surface modified with $Co^{++}$ and $Fe^{++}$ at 3 and 8 weight percent respectively based on the weight of the fully treated particles. These magnetic pigments were tested for magnetic properties and were coated in a conventional magnetic coating formulation onto a nonmagnetic substrate. The coated tapes were also tested. The pigments had a coercivity of 762 Oe, and specific surface area of 38 m²/g. The magnetic tapes had Squareness of 0.88, switching field distribution of 0.286, and retentivity (Br) of 1627 Gauss.

What is claimed is:

1. A method of producing goethite particles comprising the steps of
   a) reacting less than a stoichiometric amount of an alkali compound with an iron (II) salt in aqueous solution to form complex intermediate precipitate,
   b) oxidizing the iron (II) in the complex intermediate precipitate to iron (III) at an average oxidation rate less than 10 g iron(III) formed/l/hr until 20 to 70 mole % of the iron (II) in the complex intermediate precipitate has been converted to iron (III), and
   c) after 20 to 70% of the iron (II) has been converted to iron (III), increasing the average oxidation rate to greater than 10 g iron(III) formed/l/hr to form goethite particles, wherein the method is a batch method.

2. The method of claim 1 wherein the oxidation rate of step b) is between 2 and 9 g iron(III)/l/hr.

3. The method of claim 1 wherein the oxidation rate of step c) is greater than 12 g iron(III)/l/hr.

4. The method of claim 1 wherein the oxidation rate of step c) is between 12 and 40 g iron (III)/l/hr.

5. The method of claim 1 wherein the oxidation rate of step b) is between 3 and 8 g iron(III)/l/hr.

6. The method of claim 1 wherein after the iron (II) has been converted to iron (III) to form goethite particles, the goethite particles are grown by further addition of alkali followed by oxidation.

7. The method of claim 1 wherein a growth regulator is included in the aqueous solution.

8. The method of claim 1 wherein the oxidation rate is increased by increasing the amount of oxidizing agent available.

9. The method of claim 1 wherein the iron (II) in the precipitate is oxidized by supplying an oxidizing gas to the aqueous solution.

10. The method of claim 9 wherein the oxidizing gas is air.

11. The method of claim 10 wherein the oxidation rate is increased by increasing the flow rate of air to the aqueous solution.

12. The method of claim 1 wherein the oxidation rate is increased by stepwise increases in temperature.

* * * * *